(12) United States Patent
van't Schip

(10) Patent No.: US 7,955,467 B2
(45) Date of Patent: Jun. 7, 2011

(54) METHOD AND DEVICE FOR PRODUCING A GROOVE NEAR AN INTENDED EDGE PART OF A CONVEYOR BELT, WHICH GROOVE IS INTENDED TO BE FILLED WITH A FILLER HAVING SEALING PROPERTIES

(75) Inventor: Joannes Stefanus van't Schip, Zuid-Scharwoude (NL)

(73) Assignee: Flexible Steel Lacing Company, Downers Grove, IL (US)

( * ) Notice: Subject to any disclaimer, the term of this patent is extended or adjusted under 35 U.S.C. 154(b) by 148 days.

(21) Appl. No.: 12/092,474

(22) PCT Filed: Nov. 7, 2006

(86) PCT No.: PCT/NL2006/000557
§ 371 (c)(1),
(2), (4) Date: Jul. 1, 2008

(87) PCT Pub. No.: WO2007/055566
PCT Pub. Date: May 18, 2007

(65) Prior Publication Data
US 2008/0289752 A1 Nov. 27, 2008

(30) Foreign Application Priority Data
Nov. 8, 2005 (NL) .................................. 1030370

(51) Int. Cl.
*B29D 29/06* (2006.01)
(52) U.S. Cl. .......... 156/268; 156/267; 156/88; 156/257; 156/137; 83/14; 83/18; 83/176; 83/175; 83/145

(58) Field of Classification Search .................. 156/268, 156/267, 88, 257, 137; 474/271
See application file for complete search history.

(56) References Cited

U.S. PATENT DOCUMENTS

| 3,212,185 | A | * | 10/1965 | Keiter | 29/564 |
| 3,840,424 | A | * | 10/1974 | Morrison | 428/68 |
| 3,978,747 | A | * | 9/1976 | Lyon | 83/18 |
| 4,656,910 | A | | 4/1987 | Peterson | |
| 4,670,636 | A | * | 6/1987 | Taub et al. | 219/121.18 |
| 5,069,101 | A | | 12/1991 | Kleemola | |
| 2006/0107811 | A1 | * | 5/2006 | Tanaka et al. | 83/175 |

FOREIGN PATENT DOCUMENTS

| DE | 3742167 A1 | 6/1989 |
| GB | 1170441 | 11/1969 |
| WO | 8803905 | 6/1988 |

* cited by examiner

*Primary Examiner* — Khanh Nguyen
*Assistant Examiner* — Margaret Squalls
(74) *Attorney, Agent, or Firm* — Fitch Even Tabin & Flannery

(57) ABSTRACT

The present invention relates to a method and device for producing a groove near an intended edge part of a conveyor belt, which groove is intended to be filled with a filler having sealing properties, in which the groove is formed by removing conveyor belt material from one of the surfaces of the conveyor belt and in which, during the step of removing conveyor belt material, the conveyor belt is bent at the position of the groove to be formed near the intended edge part, and also to a conveyor belt in which a groove is produced in this manner.

5 Claims, 9 Drawing Sheets

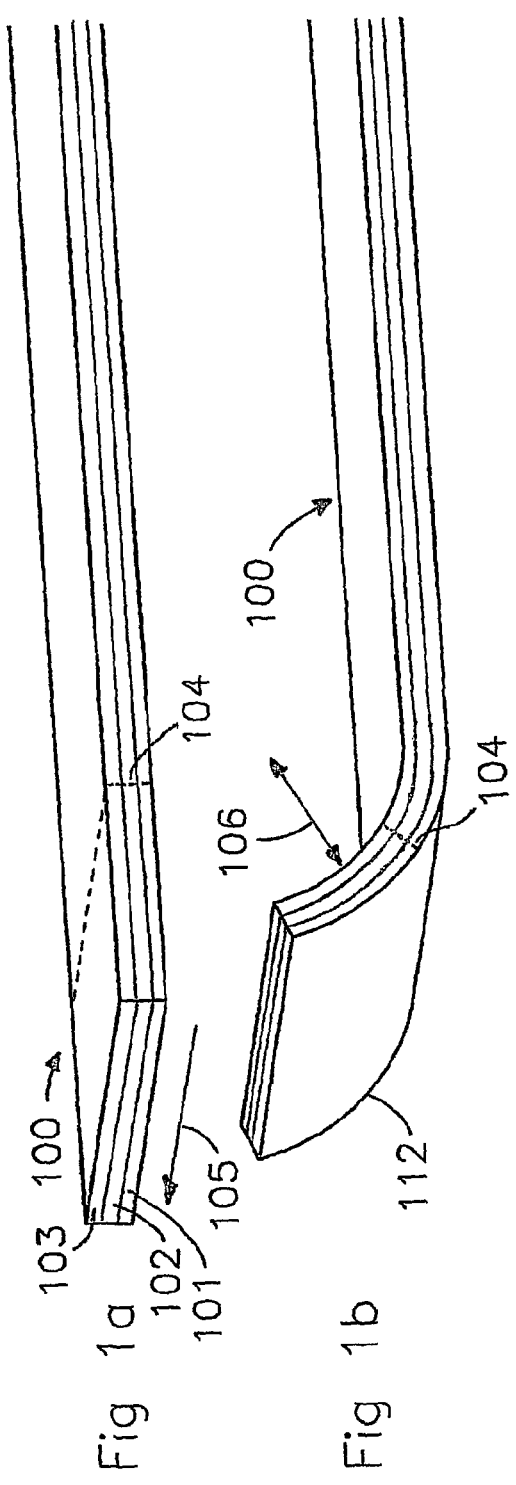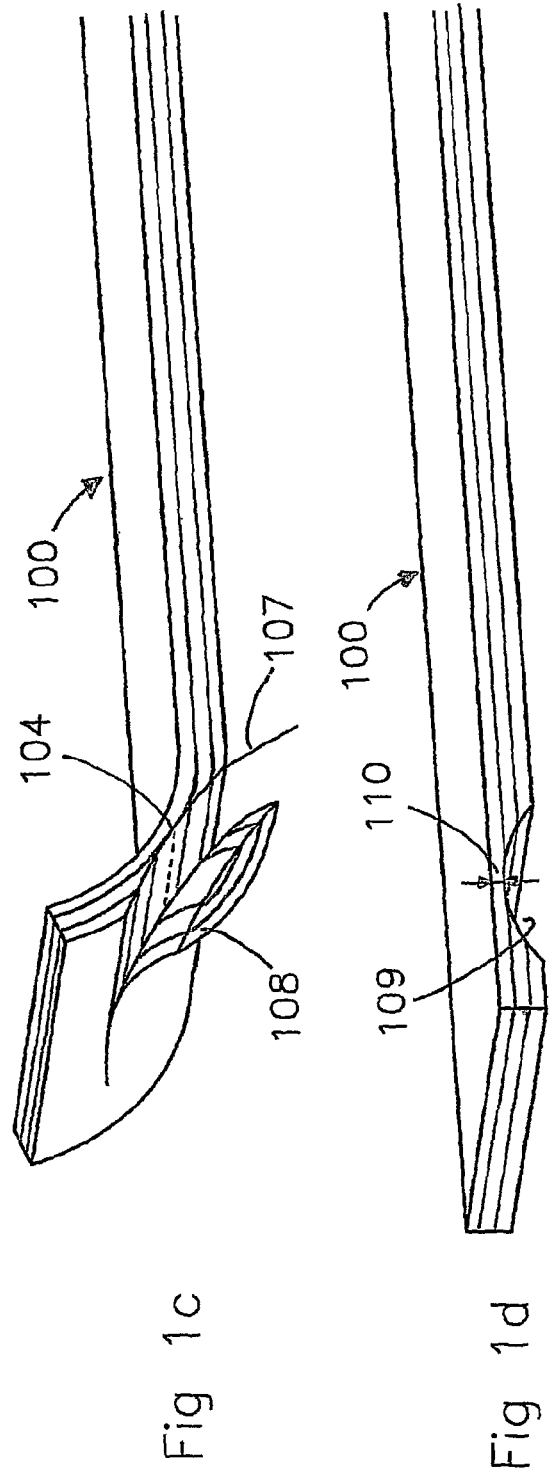

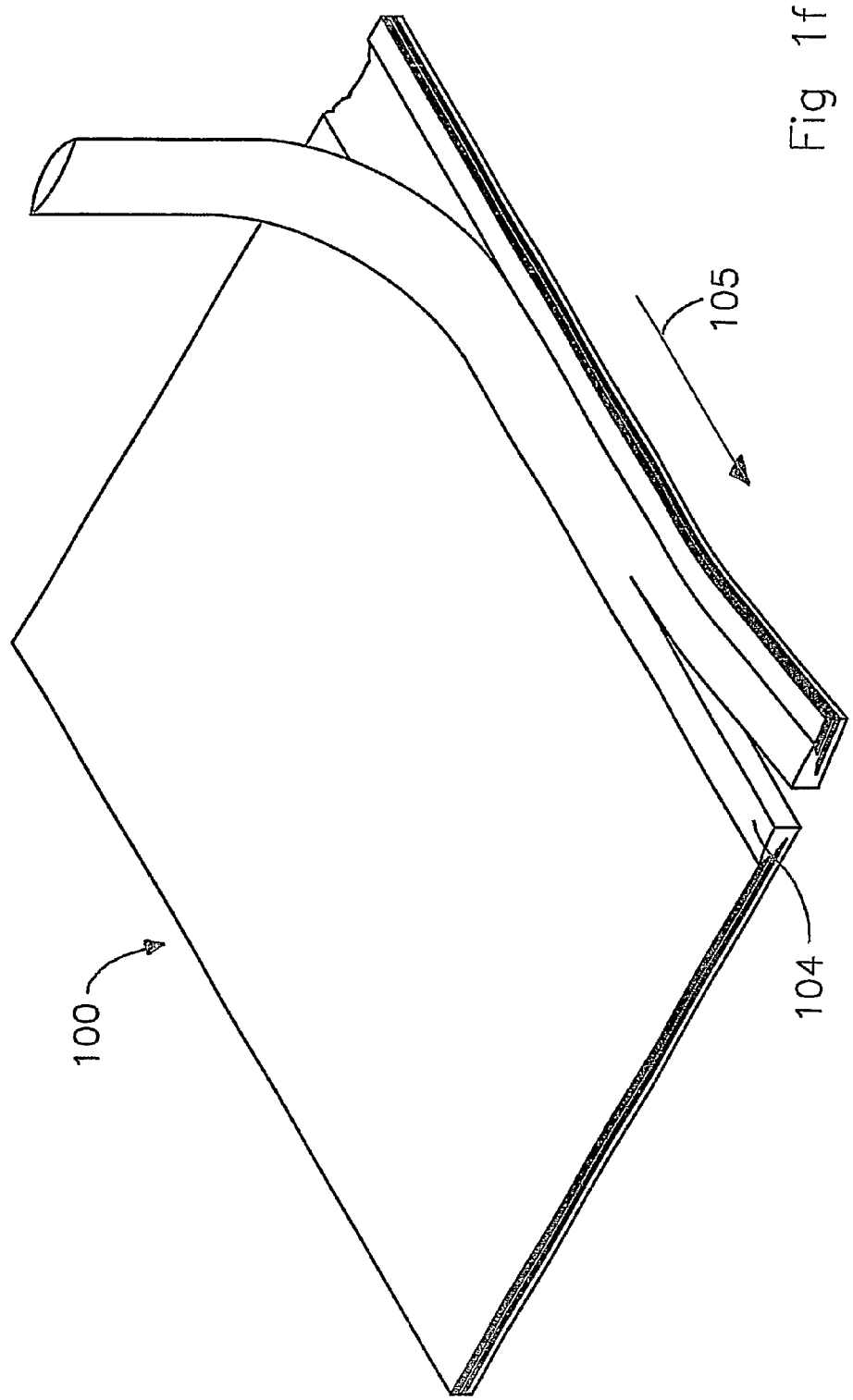

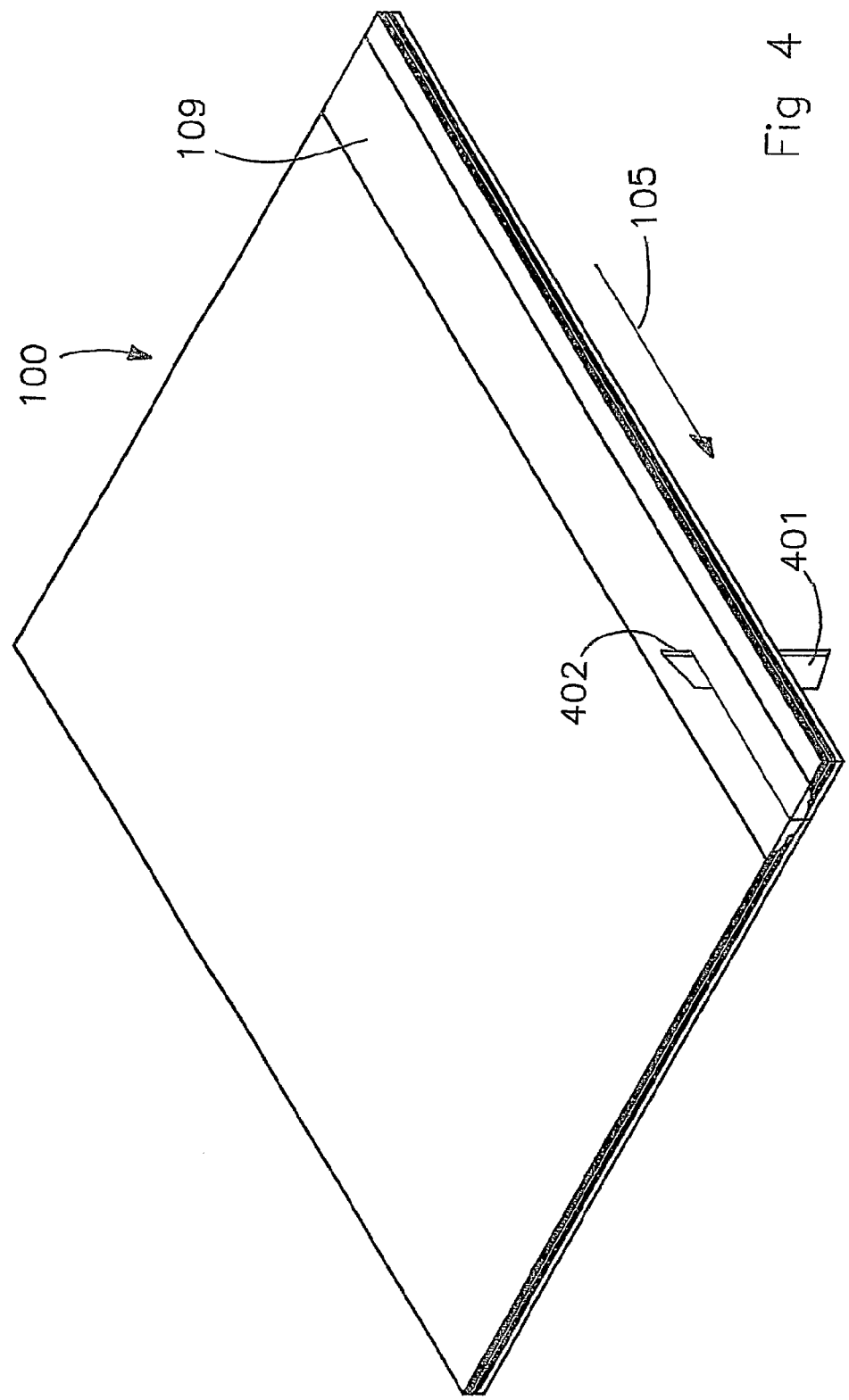

METHOD AND DEVICE FOR PRODUCING A GROOVE NEAR AN INTENDED EDGE PART OF A CONVEYOR BELT, WHICH GROOVE IS INTENDED TO BE FILLED WITH A FILLER HAVING SEALING PROPERTIES

CROSS-REFERENCE TO RELATED APPLICATIONS

This application is the National Stage of International Application No. PCT/NL2006/000557, filed Nov. 7, 2006, which claims the benefit of Netherlands Application No. NL 1030370, filed Nov. 8, 2005, the contents of which is incorporated by reference herein.

FIELD OF THE INVENTION

The present invention relates to producing a groove near an intended edge part of a conveyor belt, which groove is intended to be filled with a filler having sealing properties.

BACKGROUND OF THE INVENTION

Conveyor belts are a known means for conveying goods, for example raw materials, semi-finished products or products in a manufacturing environment for foodstuff, for example. In known embodiments, such conveyor belts are composed of one or more layers of material, each layer having different properties which are relevant for the quality and intended use of the conveyor belt. A customary construction for a conveyor belt is a coating layer, for example made from polyurethane, on which one or more reinforcing layers are arranged, for example made from a porous, fibre-like structure made from polyester fabric. The reinforcing layers may in this case be impregnated and the conveyor belt may furthermore be provided with a base layer made from polyurethane. All layers extend over the entire width of the conveyor belt, for example in order to facilitate the production.

A drawback of a conveyor belt constructed in this way is that the reinforcing layers with a porous, fibre-like structure adjoin the edge parts of the conveyor belt. This makes it possible for impurities to penetrate the conveyor belt during use, which is not hygienic and therefore undesirable.

A known solution for eliminating this disadvantage is sealing the edges of the conveyor belt using a non-porous material. U.S. Pat. No. 3,840,424, for example, discloses producing a groove near an intended edge part of the conveyor belt, which groove is then filled with a filler with sealing properties.

In order for the filler to adhere permanently to the groove, the shape of the groove has to be trapezoid or stepped in the transverse direction, as a result of which the reinforcing layers are cut off in a staggered manner when the groove is produced. The groove is usually produced by gouging the conveyor belt with a knife specially provided for this purpose and having a cutting edge with the required trapezium or stepped shape. Knives provided with a trapezium or stepped cutting edge have the drawback that they have to be specially selected, tailored to the conveyor belt to be sealed, for example based on thickness and the position of the reinforcing layers. They also have the disadvantage that they are relatively complicated, expensive and difficult to regrind. In addition, the required cutting forces are considerable.

Due to the desired small remaining thickness at the groove, the conveyor belt is more susceptible to damage by the large cutting forces, as a result of which it is only possible in practice to produce a groove which is not as deep as is desired.

The large cutting forces furthermore require large driving forces to pull the conveyor belt through the machine. In order to be able to generate these large driving forces, large clamping forces are required, which may force the belt out of the desired direction. With known devices, the conveyor belt is passed through the machine by hand. During this procedure, small corrections are carried out by hand in order to ensure that the belt runs through the machine in a straight line. It is very difficult to form a sufficiently straight groove in this way.

Because of the large amount of manual work involved, it is not possible to produce more than one groove at a time in a conveyor belt. In practice, it is usually desirable to seal off several edge parts, so that the conveyor belt has to be passed through twice.

SUMMARY OF THE INVENTION

It is therefore an object of the present invention to eliminate the abovementioned disadvantages, at least partially, and/or to provide a usable alternative. In particular, it is an object of the invention to provide an inexpensive, quick, permanent and reliable method and device in order to produce a groove near an intended edge part of a conveyor belt, which groove is intended to be filled with a filter having sealing properties.

To this end, the invention provides a method for producing a groove near an intended edge part of a conveyor belt, which groove is intended to be filled with a filler having sealing properties. In this case, a groove is formed in a conveyor belt by removing conveyor belt material from one of the surfaces of the conveyor belt. During removal of the conveyor belt material, the conveyor belt is bent at the position of the groove to be formed near the intended edge part, at least in a plane which is substantially at right angles to the longitudinal direction of the groove to be formed.

Advantageously, it is now possible to remove conveyor belt material from the surface of the conveyor belt, without a groove cutting element with a specially formed cutting edge being required for this purpose. Furthermore, it is advantageous that no means or parts of means have to be changed in order to carry out the method and produce a groove in a conveyor belt of arbitrary thickness.

Another advantage is the fact that the required cutting edge can be straight or singly curved. The groove-cutting element can execute a cutting movement, for example rotational or translational, which is at right angles to the direction of movement of the conveyor belt. To this end, the cutting forces exerted on the conveyor belt are reduced to a considerable extent.

Furthermore, the invention offers the possibility of removing conveyor belt material at a high or varying speed. Using the latter, it is also possible to produce a groove in a conveyor belt, in which the thickness of the remaining conveyor belt material measured at the position of the groove can be very thin. Thus, the method can be used for conveyor belts with a very thin coating layer, or in order to produce a deeper groove in a conveyor belt than is possible by means of the known method. This method may furthermore provide the possibility of using a first cutting element which is not very susceptible to wear. This offers the further advantage that, in order to form the groove, use may be made of a groove-cutting element in which the cutting forces are small, so that the risk of damage to the conveyor belt is small. In addition, the invention offers the advantage that, as a result of said higher or varying speed with which the conveyor belt material can be removed, it becomes attractive to carry out further operations on the conveyor belt at the same time as the step of removing material from said conveyor belt, since now only the additional operations can possibly determine the speed.

Furthermore, the invention relates to a device for producing a groove near an intended edge part of a conveyor belt, which groove is intended to be filled with a filler having sealing properties, which is provided with a bending element in order to bend the conveyor belt at least in a plane substantially at right angles to the longitudinal direction of the groove to be formed, a groove-cutting element for forming the groove and feed-through means for moving the conveyor belt through the device.

It is be noted that GB-1,170,441 shows a device for cutting longitudinal grooves in a continuous conveyor belt, in which a cutter holder is arranged opposite a reversing roller along which the conveyor belt is conducted. However, at the position of the cutter holder, the conveyor belt is bent in the longitudinal direction of the conveyor belt or the grooves to be cut, respectively. Similarly to the abovementioned U.S. Pat. No. 3,840,424, this still restricts the cutting knives, the cutting forces and the result which can be achieved. In addition, the cut-out grooves are intended for a different purpose.

In a preferred embodiment according to the present invention, the relative position of the groove-cutting element relative to the bending element can be set. This offers the advantage that the production of the groove can be started and stopped at any position on the conveyor belt, as a result of which the system is suitable for, but not limited to, processing conveyor belts which have been made endless. In a production process for conveyor belts, it may be advantageous to make the conveyor belts endless before any further steps are carried out. In addition, if a drivably movable knife is used as the groove-cutting element, the cutting forces which are required in order to remove the conveyor belt material are advantageously low, as a result of which the removal speed can be high, while the groove can be produced accurately and the material thickness remaining at the groove can be very thin.

In addition, the invention relates to a conveyor belt comprising a cut-off filled groove at the edge of the conveyor belt, which groove comprises a continuous groove wall, in particular having a concave curvature, and a conveyor belt comprising a coating layer and a layer underneath the latter having porous properties, in particular a reinforcing layer, in which the groove at least extends over the entire thickness of the layer with porous properties.

Further embodiments of the invention are defined in the subclaims.

BRIEF DESCRIPTION OF THE DRAWINGS

The invention will be explained below in detail with reference to the accompanying drawings, which should be seen as illustrating the invention and in no way limiting the scope of protection of the present invention, in which:

FIGS. 1a-1f show perspective views of a number of phases of the step of bending, cutting, filling and cutting off at least part of a conveyor belt;

FIG. 4 shows a perspective view of a device for cutting off part of a conveyor belt having a filled groove;

DETAILED DESCRIPTION OF PREFERRED EMBODIMENTS

Figure 1E:
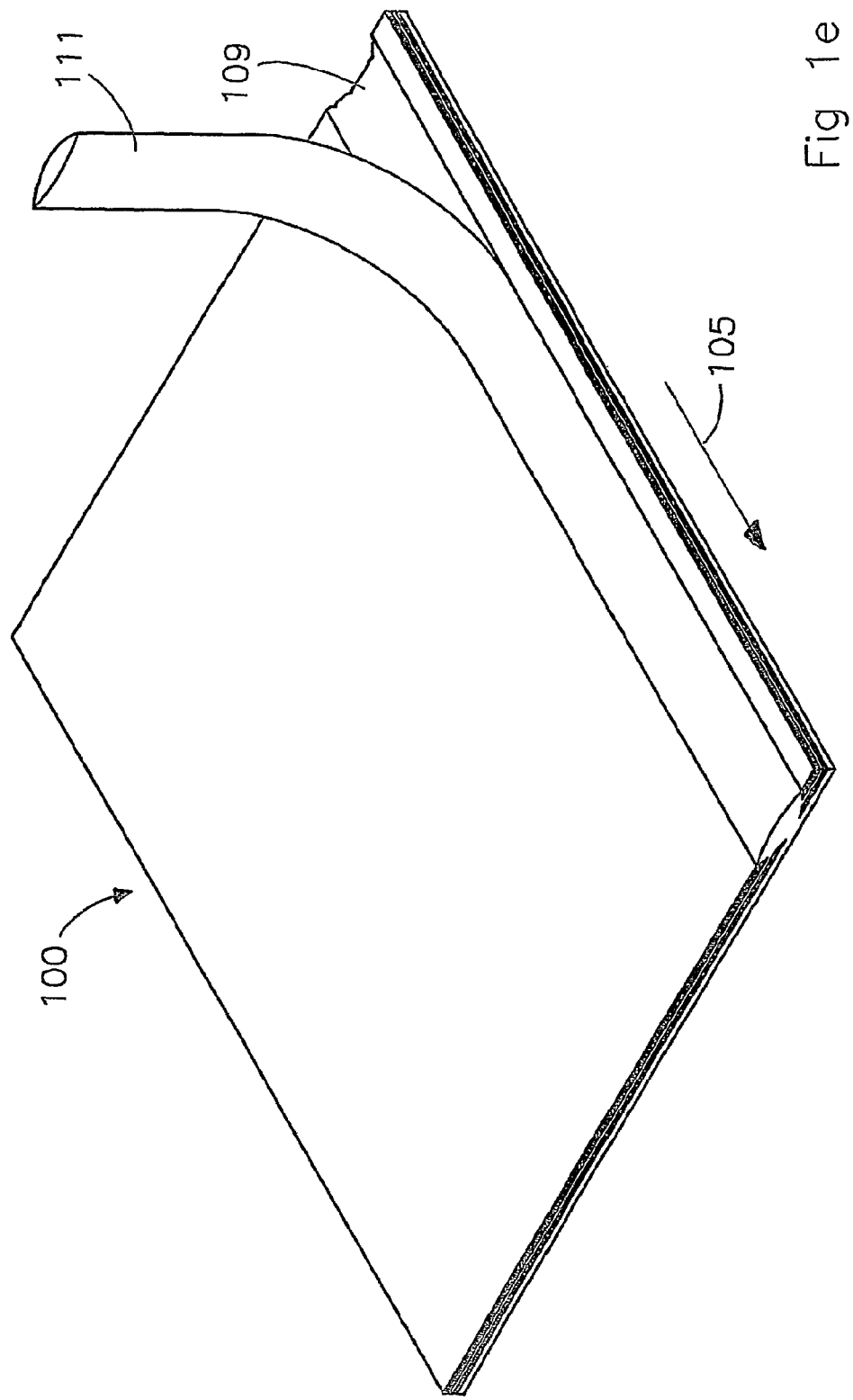

FIG. 1a only shows a strip of a conveyor belt 100, which is composed of a base layer 101, a reinforcing layer 102 and a coating layer 103 and having an intended edge part 104. The conveyor belt has a substantially flat shape, and extends lengthwise in the direction indicated by arrow 105. In particular, the strip forms part of a conveyor belt, more in particular of a conveyor belt which has been made endless.

FIG. 1b shows the conveyor belt 100 from FIG. 1a, in which a curvature 112 with a radius 106 is provided at the position of the intended edge part 104. The curvature 112 is provided in a plane substantially at right angles to the longitudinal direction of the groove to be formed. The longitudinal direction of the groove to be formed in this case extends in the longitudinal direction 105 of the conveyor belt 100. The curvature 112 in this case as it were extends around the axial direction of the groove to be formed, i.e. around the longitudinal direction 105 indicated in the drawing. The curvature 112 only has to be provided locally in the conveyor belt 100, i.e. opposite or near a groove-cutting element with which the groove material will be removed. At the position of the groove-cutting element, the conveyor belt is therefore bent in such a manner that a curvature is produced in the conveyor belt at that position, which curvature at least extends in a plane which is substantially at right angles to the longitudinal direction of the groove to be formed. In practice, the curvature 112 does not necessarily have a fixed radius 106, but several shapes of curvatures are conceivable, each matching a type of conveyor belt.

FIG. 1c shows the fragment of the conveyor belt 100 from FIG. 1b, from which material 108 is removed along a cutting line 107. The cutting line 107 is in this case a curved line, but may also be a straight line or a differently shaped line.

FIG. 1d shows the conveyor belt 100 from FIG. 1c, in which the removal of the material 108 has been completed, and in which the conveyor belt is no longer curved, as a result of which a groove 109 having the curved shape shown in FIG. 1d was created. The groove 109 having this shape has the advantage that it produces a large bonding surface for the filler, thus making it possible to create a permanently filled groove 109, in particular in the case of a conveyor belt having a plurality of reinforcing layers, with the reinforcing layers being cut off in a staggered manner.

At the position of the groove 109, the coating layer 103 has a remaining material thickness 110. The groove 109 extends throughout the entire thickness of the reinforcing layer 102 with porous properties and through a part of the coating layer 103.

FIG. 1e shows the fragment of the conveyor belt 100 from FIG. 1d, in which a filler 111 has been introduced in the groove 109. The filler 111 can fill the groove 109 partially, or fill the groove 109 exactly or extend outside the groove 109. In practice, the aim will be to fill the groove 109 exactly.

FIG. 1f shows the fragment of the conveyor belt 100 from FIG. 1e, in which the conveyor belt 100 is cut along the groove 109 in the longitudinal direction, resulting in a conveyor belt 100 having a sealed edge part 104.

Figure 2A:
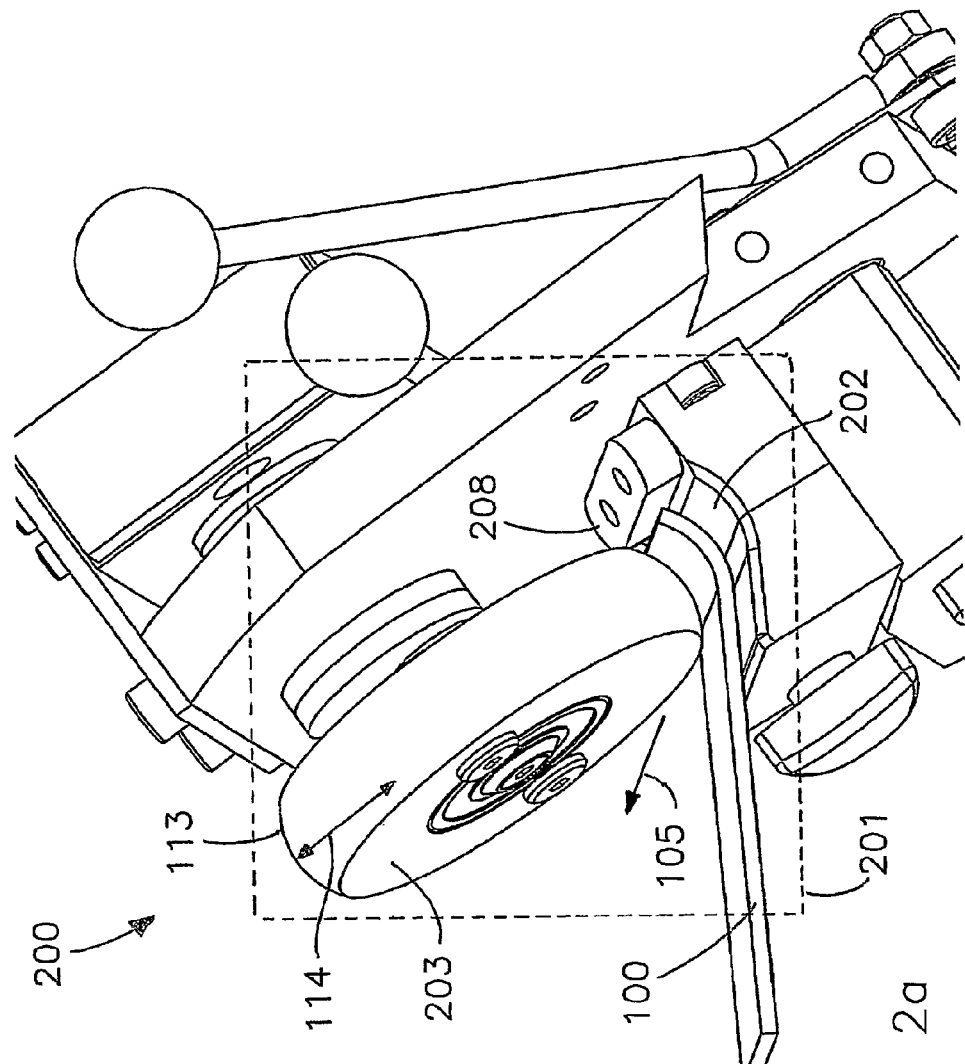
FIG. 2a shows a perspective view of a device for producing a groove in a conveyor belt, viewed from a first direction.

FIG. 2a shows a device 200 for producing a groove 109 in the conveyor belt 100 near the intended edge part 104 of the conveyor belt 100. To this end, the device 200 comprises a bending element 201, which comprises an anvil 202 along which the conveyor belt 100 is conducted in the direction 105 with the aid of a pressing means in the shape of a wheel 203, which presses the conveyor belt 100 against the anvil 202. A wheel 203 is the preferred choice, as it presses the conveyor belt 100 in the direction 105 without a large braking force. In one embodiment, the wheel 203 interacts with a roller bearing (not shown) which is disposed at or in the anvil 202. The outer surface of the wheel 203 has a curvature 113 which, during use, determines the curvature 112 of the conveyor belt 100, as illustrated in FIG. 1b. This curvature 113 may have any desired shape or may be a curvature according to a part of a circle with a specific radius 114. The radius 114 of the curvature 113 of the wheel 203 is in this case chosen such that it is suitable for bending various kinds of conveyor belts. A suitable curvature 113 of the wheel according to the circle segment was found to have a radius 114 of between 10 and 40 mm, and in particular of approximately 20 mm. With this curvature, the risk of tears or other damage or non-elastic deformation to various types of conveyor belt is small, and the material to form the groove can readily be removed.

In one embodiment, the anvil 202 is furthermore provided with a limiting cam 208 for limiting the position of the conveyor belt 100 through the device 200 in a direction at right angles to the throughput direction 105.

Figure 2B:
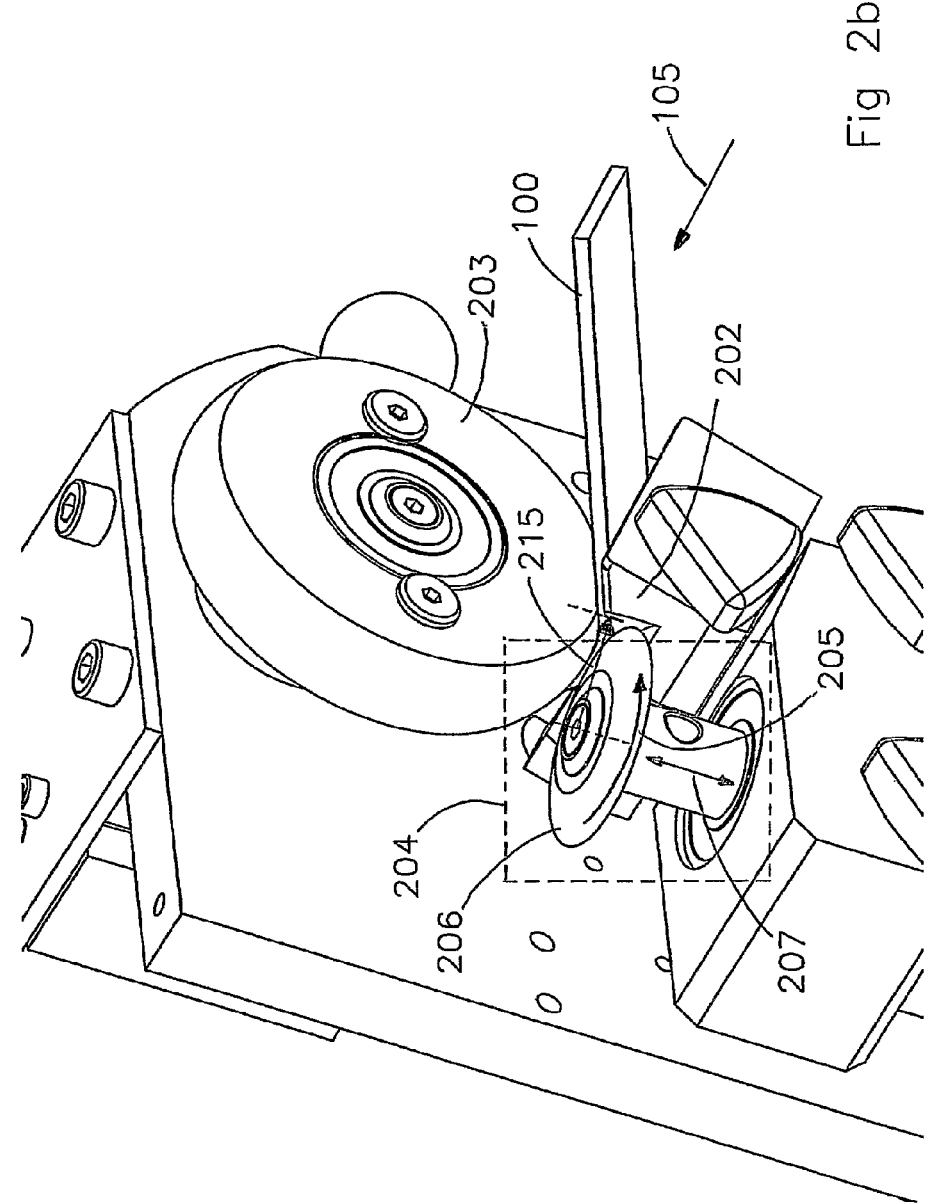
FIG. 2b again shows a perspective view of a device for producing a groove in the conveyor belt, viewed from a second direction.

FIG. 2b shows the same device 200, but now viewed from a different side. In the drawing, the direction 105 in which the conveyor belt 100 is conducted is depicted again for the sake of orientation. Likewise, the anvil 202 and the wheel 203 are illustrated again. Furthermore, a groove-cutting element 204 is represented in FIG. 2b which, in this embodiment, is designed as a knife 206 which, during use, is rotatably driven in the direction 205. The knife cuts the conveyor belt 100 along the cutting line 107 in FIG. 1c. A radius 215 of between 10 and 40 mm, and in particular a radius 215 of 20 mm has proved to be advantageous for the knife 206.

The anvil 202 is in this case adjustable with respect to the wheel 203. As a result, a conveyor belt 100 of any desired thickness may be provided with a groove 109 by the device 200. The bending element 201 and the rotatably drivable knife 206 are adjustable relative to one another in the direction 207. As a result, a conveyor belt 100 of a given thickness can be provided with a groove 109 with a desired thickness 110 of the remaining conveyor belt material.

Figure 3:
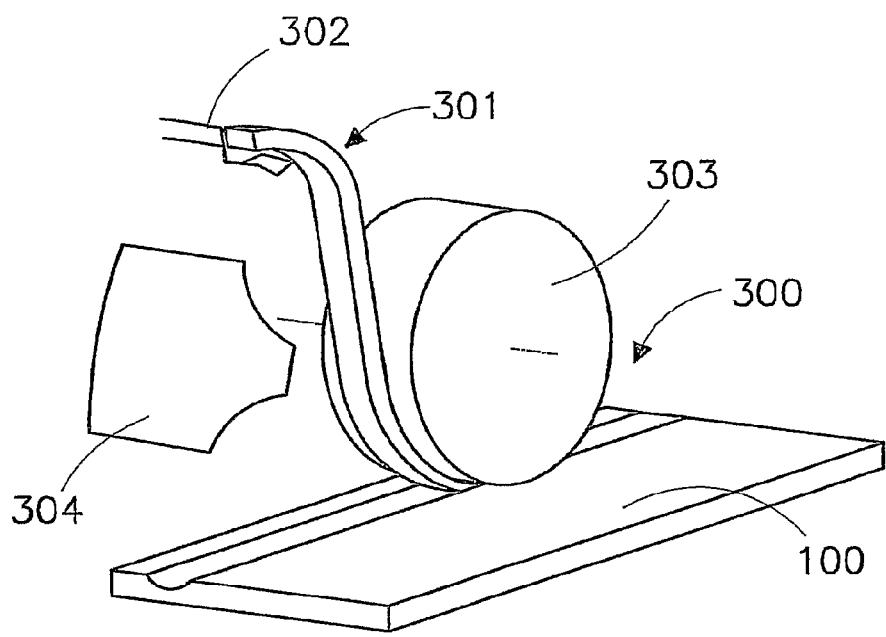
FIG. 3 shows a perspective view of a device for filling a groove in the conveyor belt.

FIG. 3 shows a part of the device 200, relating to a filling element 300 for filling the groove 109 produced using a filler 301 suitable for the purpose. The filler 301 consists of any desired material with sealing properties, for example of a material identical to that from which the coating layer or base layer of the conveyor belt is formed.

In one embodiment, the filler 301 comprises polyurethane, in the shape of a strip having a width and thickness in the order of magnitude of the groove 109 provided in the conveyor belt. The filling element comprises a conductor 302 for conducting the filler 301 towards the groove 109 of a conveyor belt 100, an introduction means 303 for introducing the filler 301 conducted to the groove into the groove 109, and a heating means 304 for heating the filler 301 and the part of the conveyor belt 100 which directly adjoins the groove 109, at least at the position of the introduction means 303. In this way, the filler 301 is introduced in the groove 109 by fusing it with the conveyor belt. The heating means 304 may in this case be configured for supplying hot air, for example air having a temperature of approximately 600 degrees Celsius. During use, the filler 301 is joined together with the conveyor belt 100 at a speed which is substantially identical to that with which the conveyor belt is passed through the filling element. In this manner, a conveyor belt 100 with a filled groove 109 is produced, as is illustrated in FIG. 1e.

FIG. 4 shows a part of the device 200, relating to an edge-cutting element 400, for producing a sealed edge part 104 on the conveyor belt 100 by cutting the conveyor belt 100 in the longitudinal direction of the groove 109 through the filler 301. The edge-cutting device 400 in this case comprises a knife 401 which is arranged in a position in which a cutting edge 402 of the knife is situated at right angles to the longitudinal direction 105 of the conveyor belt 100, and in which the knife 401 cuts through the conveyor belt at the filled groove 109.

Figure 5A:
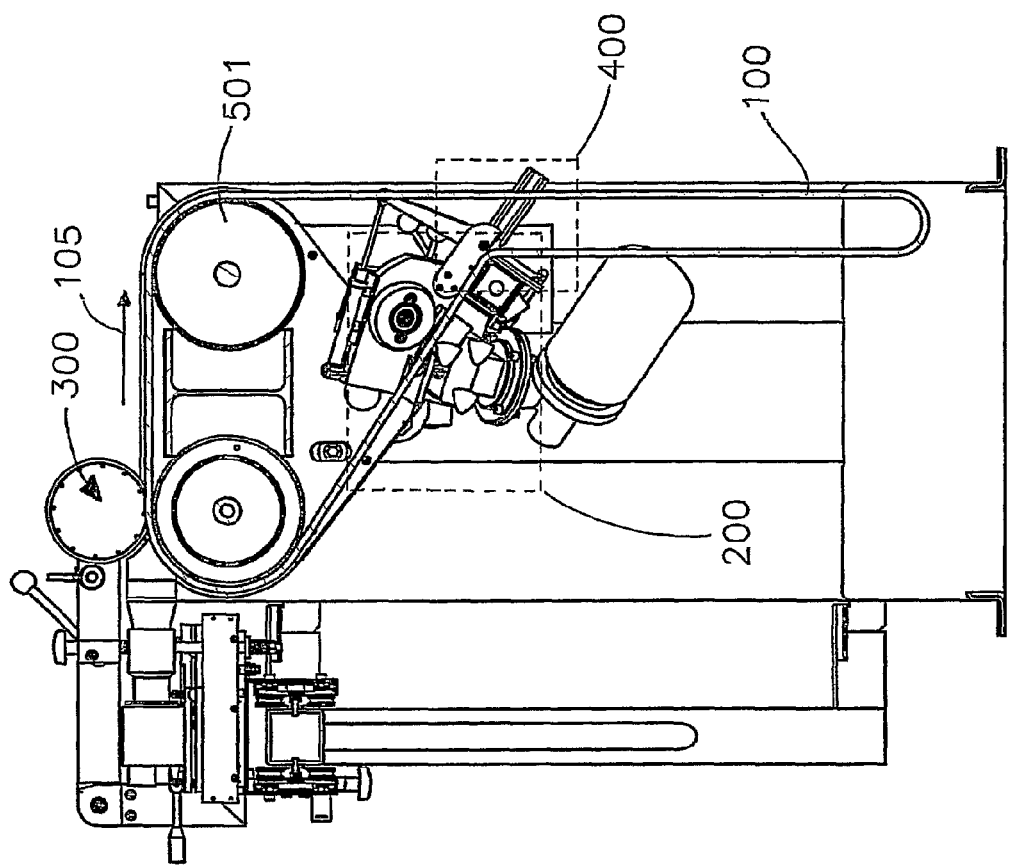
FIG. 5a shows a perspective view of a combined device for producing a groove in a conveyor belt, filling the groove and cutting the conveyor belt.

FIG. 5a shows an illustration of the device 200 with the bending and cutting elements 201 and 204, respectively, in combination with the filling element 300 and the edge-cutting element 400. The device 200 is furthermore provided with feed-through means in the shape of drivable rotating roller guides 501 for advancing the conveyor belt 100.

During use of the device 200, a conveyor belt 100 is conducted through the machine in the direction 105, the step of producing the groove 109 being carried out first. As soon as a part of the conveyor belt 100 provided with the groove 109 has been conducted through the device 200 up to the point where the start of the groove 109 has reached the filling element 300, the step of introducing a filler into the groove 109 can be carried out. As soon as the part of the conveyor belt 100 provided with the filled groove 109 reaches the edge-cutting element 400, the cutting step can be carried out. An advantage of this device 200 is therefore that the steps of producing the groove 109, the filling of the groove 109 and the cutting of the conveyor belt 100 can be carried out simultaneously on the conveyor belt 100. Another advantage of this device is that the steps of producing the groove 109, filling the groove 109 and cutting the conveyor belt 100 can be carried out using one device 200. Carrying out the steps of producing the groove 109 in the conveyor belt 100, filling this groove 109 with the filling element 300 and cutting the filled groove 109 with the edge-cutting element 400 in one device 200 is made possible by the fact that the invention offers the advantage that the cutting forces involved are small and that producing the groove can be started and stopped as desired and that the speed with which the groove 109 is produced in the conveyor belt 100 can be varied and can thus be identical to that with which the filler 301 can be introduced or to that with which the conveyor belt 100 with the filled groove 109 can be cut.

In order to ensure that no groove 109 is produced in a part of the conveyor belt 100 in which the steps of producing a groove 109, filling a groove 109 and cutting the conveyor belt 100 have already been carried out, the wheel 203 is removed from the anvil 203 in good time, and the conveyor belt 100 which has already been treated is not conducted past the cutting surface of the knife 206 again.

Figure 5B:
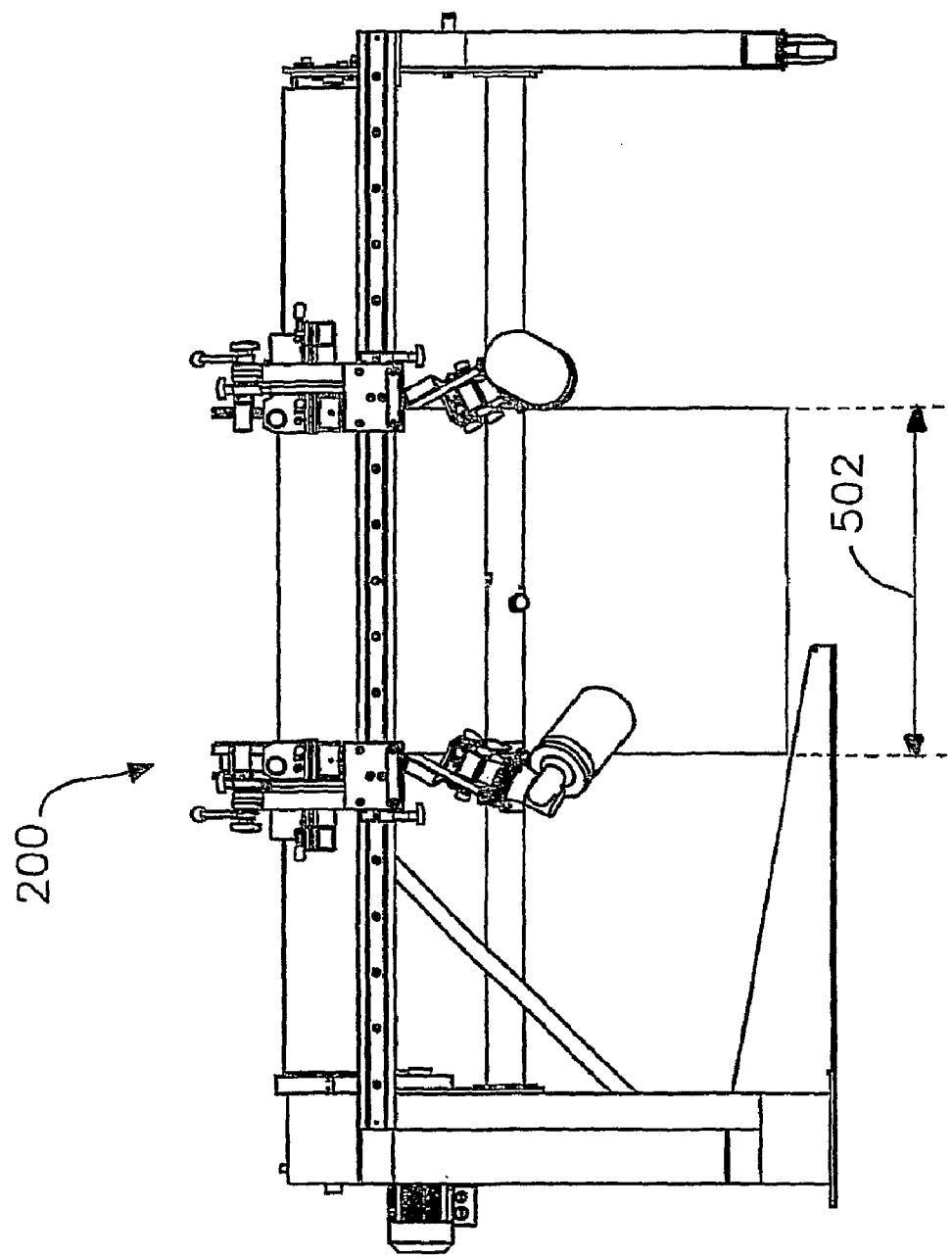
FIG. 5b shows a side view of a combined device for simultaneously producing a plurality of grooves in a conveyor belt, filling the grooves and cutting off the conveyor belt.

In a further embodiment as illustrated in FIG. 5b, the device 200 according to FIG. 5a may be designed to carry out the same operation at the position of a second intended edge part, and in that case is provided to this end with a second bending element, a second groove-cutting element a second filling element and a second edge-cutting element. In this case, it is possible to adjust the distance 502 between the intended edge parts. In one embodiment, the distance between the intended edge parts can be adjusted in a range between 15 and 200 cm.

In yet another embodiment, the device 200 is provided with a control system for controlling the passage of the conveyor belt 100, the production of the groove 109, the filling of the groove 109 and the cutting of the conveyor belt 100.

Many variants are possible in addition to the illustrated embodiments of the present invention. Thus, it is for example also possible to use a different kind of moving knife instead of a rotating knife, or a different kind of groove- or edge-cutting element, such as a laser. Furthermore, it is also possible to create a more sharply bent shape or another bend in the conveyor belt instead of a convex curvature and it is possible to carry out the steps of the method in various separate devices. Also, the bending of the conveyor belt may be effected by other means than a wheel or anvil, for example by passing the belt along a certain profile. Furthermore, the heating of the conveyor belt in order to add a filler may also be effected by means of infrared heating, laser heating or by other means. The bending element is designed such that the curvature it produces in the conveyor belt extends at least in a plane which is substantially at right angles to the longitudinal direction of the intended groove. In addition thereto, it is also possible to bend the conveyor belt in other directions. Thus, the bending element and the groove-cutting element may, for example, also be provided at the position of a reversing roller over which the conveyor belt is conducted. For this purpose, the reversing roller only has to be provided with a suitably curved profile.

Thus, the invention provides a method and a device for producing a groove near an intended edge part of a conveyor belt, which groove is intended to be filled with a filler having sealing properties, in which the groove can be produced accurately and at great speed, and in which the thickness of the conveyor belt at the groove can be very small. Furthermore, the invention provides a method and device, in which it is attractive to produce a groove in the conveyor belt at the same time as and/or at the same speed as other operations on the conveyor belt are being carried out, such as filling the groove and/or cutting through the filled groove.

What is claimed is:

1. A method for producing a groove near an intended edge part of a conveyor belt for being filled with a filler having sealing properties, the method comprising:
   advancing the conveyor belt in a predetermined belt travel direction;
   bending the conveyor belt so that as the belt is advanced a surface of the belt to be cut has a convex curvature with the opposite belt surface having a concave curvature;
   advancing the curved conveyor belt in the predetermined belt travel direction past a cutting element having a convexly curved cutting edge; and
   cutting a longitudinal groove extending in the belt travel direction in the convexly curved belt surface with the convexly curved cutting edge so that the groove has a concave curved configuration opening in an opposite direction to the concave curvature of the opposite, uncut belt surface as the convexly curved belt surface is advanced past and cut by the cutting element.

2. The method according to claim 1 wherein the conveyor belt is bent to have a curvature having a radius of between 10 and 40 mm.

3. The method according to claim 1, further comprising the step of:
   introducing the filler into the groove.

4. The method according to claim 3, further comprising the step of:
   cutting the conveyor belt in the longitudinal direction of the groove and at least through the filler in order to form a sealed edge part on the conveyor belt.

5. The method according to claim 4, in which the steps of:
   cutting the groove; and
   introducing a filler into the groove; and
   cutting the conveyor belt through the filler, are carried out simultaneously on one conveyor belt.

* * * * *